United States Patent [19]

Irwin

[11] Patent Number: 4,798,677

[45] Date of Patent: Jan. 17, 1989

[54] FILTERATOR FOR SEPARATOR

[76] Inventor: David C. Irwin, 2900 North Grand, Amarillo, Tex. 79107

[21] Appl. No.: 77,613

[22] Filed: Jul. 24, 1987

[51] Int. Cl.[4] ........................ B01D 17/02; B01D 21/02

[52] U.S. Cl. .................................... 210/799; 210/800; 210/802; 210/805; 209/454; 209/483; 222/478

[58] Field of Search ............... 210/515, 518, 522, 533, 210/536, 537, 540, 800, 803, 804, 801, 799, 521, 805; 222/478; 209/483, 454

[56] References Cited

U.S. PATENT DOCUMENTS

| | | | |
|---|---|---|---|
| 2,420,326 | 5/1947 | O'Donnell | 210/533 |
| 2,708,517 | 5/1955 | Evans | 209/454 |
| 3,563,389 | 2/1971 | Mizrahi | 210/540 |
| 3,947,355 | 3/1976 | Irwin | 210/776 |
| 4,202,778 | 5/1980 | Middelbeek | 210/522 |
| 4,213,865 | 7/1980 | Wagner | 210/522 |
| 4,219,428 | 8/1980 | Söderstöm | 210/522 |
| 4,264,439 | 4/1981 | Lefevre et al. | 209/454 |
| 4,634,526 | 1/1987 | Salkeld et al. | 210/521 |

FOREIGN PATENT DOCUMENTS

| | | | |
|---|---|---|---|
| 2088234 | 5/1982 | United Kingdom | 210/533 |

*Primary Examiner*—Richard V. Fisher
*Assistant Examiner*—Coreen Y. Lee
*Attorney, Agent, or Firm*—Wendell Coffee

[57] ABSTRACT

A separator is fed with liquid from a slaughterhouse which will be a mixture of water, tallow, and solids. The tallow rises to the top, and solids go to the bottom. Nearly clean water is withdrawn between the top and bottom. The nearly clean water is withdrawn into a plenum ring which is blocked at one point and has an outlet pipe connected adjacent to the block. Therefore, the liquid in the plenum ring flows in only one direction. The cross section of the plenum ring is many times greater than the cross section of the outlet pipe so that the flow within the plenum ring is gentle. Baffles in the plenum ring divert any tallow which rises to the top of the plenum ring back into the separator. A sump in the plenum ring adjacent to the outlet pipe draws off any solid which settle out in the plenum ring. A constant bleed is provided at the bottom of the sump to help withdraw the settling solids.

18 Claims, 2 Drawing Sheets

FILTERATOR FOR SEPARATOR

CROSS REFERENCE TO RELATED APPLICATION

None, however, Applicant filed Disclosure Document No. 172,348 on June 23, 1987, which document concerns this application.

RIGHTS TO INVENTIONS UNDER FEDERAL RESEARCH

There was no federally sponsored research and development concerning this invention.

BACKGROUND OF THE INVENTION (1) Field of the Invention

This invention relates to disposal of slaughterhouse waste liquids, and more particularly to a gravitational separation of the oils and tallow to the top and heavier solids to the bottom, with cleansed water drawn off from in between.

Applicant submits that a slaughterhouse operator is one having ordinary skill in this art. Applicant believes this application to be in the field of liquid separation.

(2) Description of the Related Art

This invention is an improvement for the equipment disclosed in my prior U.S. Pat. No. 3,947,355; issued Mar. 30, 1976. That patent discloses a separator tank. The tank has a cylindrical container with a vertical axis. The inlet material is fed to the tank in a quiescent zone about midpoint between a liquid surface level at the top and a solid waste sump at the bottom. The cleansed water is removed from the quiescent zone which is the zone between the liquid surface level at the top and the sump at the bottom.

In operation, the flow into the separator is about 1,000 gallons per minute. Most of the outlet from the separator is the cleansed water, which therefore also has a flow rate of about 1,000 gallons per minute. The rest of the outlet is the water, tallow, and oil that is skimmed from the top and the water used to flush the solids from the sump.

Operations show that there is difficulty withdrawing water at this flow rate from the quiescent zone without disturbing or stirring up the liquid at the quiescent zone. I.e., the flow rates are so large that it inherently causes turbulence of the water; therefore, causing a certain amount of tallow, oils, and solids to be withdrawn at the water outlet.

SUMMARY OF THE INVENTION (1) Progressive Contribution to the Art

This invention alleviates the problem by withdrawing the liquid from the quiescent zone in a band around the full circumference of the cylindrical container. The liquid is drawn into a plenum ring which has about six times the cross sectional area as the outlet pipe. This has advantages. First, there is little or no disturbance or turbulence caused by the withdrawal of the liquid into the plenum ring. Second, within the plenum ring there is a gentle flow so that the tallow and oil can separate and rise to the surface or the top of the plenum ring while the solids settle to the bottom of the plenum ring. Therefore, a sump in the plenum ring can pull off the settled solids while at the same time, the tallow and oil at the surface can be returned to the separator.

(2) Objects of this Invention

An object of this invention is to separate the tallow, oils, and solid materials of slaughterhouse waste from the water.

Further objects are to achieve the above with devices that are sturdy, compact, durable, simple, safe, efficient, versatile, ecologically compatible, energy conserving, and reliable, yet inexpensive and easy to manufacture, install, adjust, operate and maintain.

Other objects are to achieve the above with a method that is rapid, versatile, ecologically compatible, energy conserving, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

Figure 1:
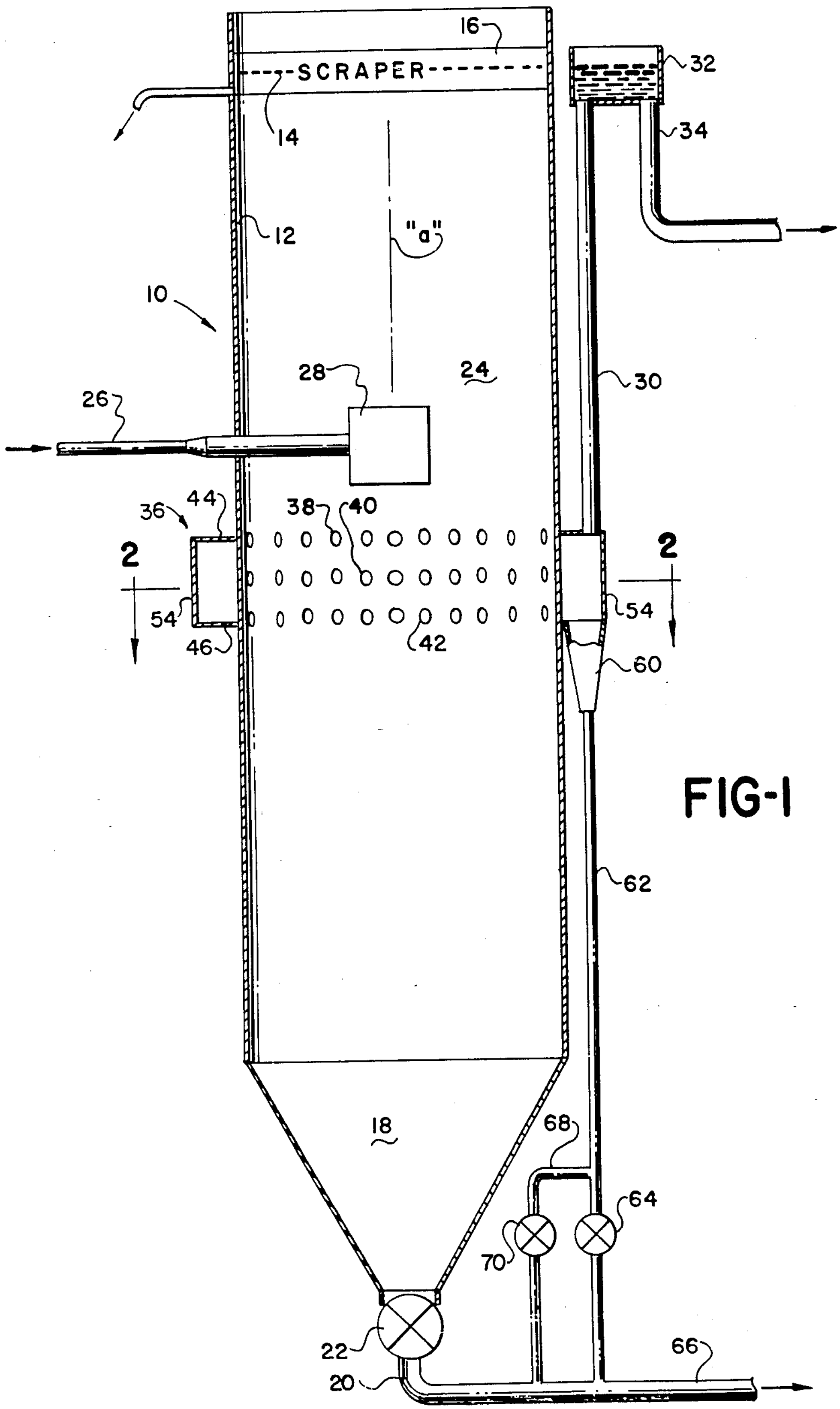
FIG. 1 is a schematic axial sectional view of a separator with a plenum ring according to this invention attached thereto.
Figure 2:
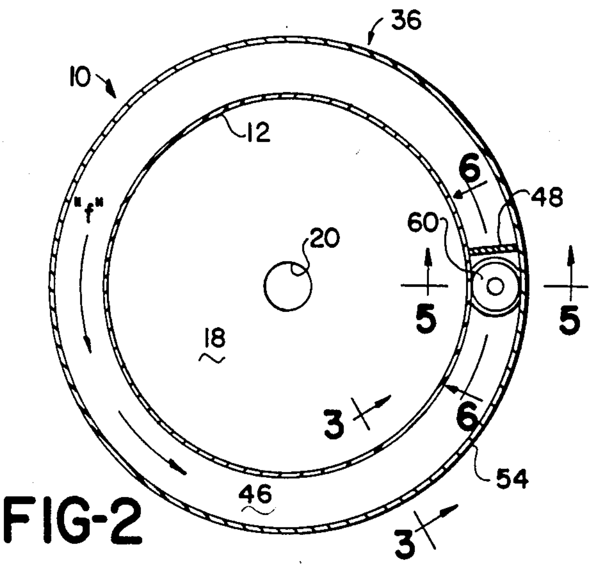
FIG. 2 is a cross sectional view taken substantially on line 2—2 of FIG. 1.

As an aid to correlating the terms of the claims to the exemplary drawing, the following catalog of elements and steps is provided:

10: separator
12: container
14: liquid surface level
16: scraper
18: sump
20: sump line
22: sump valve
24: quiescent zone
26: inlet conduit
28: inlet diffuser
30: outlet pipe
32: open box
34: drain pipe
36: plenum ring
38: upper holes
40: middle holes
42: lower holes
44: top plate
46: bottom plate
48: drain plate
50: baffles
52: leading edge
54: outer plate
56: trailing edge
58: bottom edge
60: plenum sump
62: plenum sump line
64: plenum sump valve
66: solid drain line
68: bleed line
70: bleed valve
72: deflection plate 74: leading edge
76: trailing edge
"a": axis
"f": flow arrows

DESCRIPTION OF THE PREFERRED EMBODIMENT

Referring to the drawing, there may be seen separator 10. The principle portion of the separator 10 is the elongated cylindrical container 12 having a vertical axis as shown in the drawing by "a". The container is substantially full of liquid having a liquid surface level 14 near the top. Scraper means 16 have been indicated by a block. Specific reference is made to my prior U.S. Pat. No. 3,947,355 for the details of the scraper which is means for removing tallow from the liquid surface level.

Sump 18 is in the bottom of container 12. The sump slopes to an outlet sump line 20. Sump valve 22 is in the sump line 20 for the same purposes expressed in my prior patent referred to above.

It will be noted that there is a quiescent zone 24 of liquid which extends between the sump 18 at the bottom and the liquid surface level 14 at the top. Inlet conduit 26 is connected to a source of slaughterhouse waste which will be understood is a liquid mixture of many things, but at least contains water, tallow, and solids. Therefore, the liquid inlet conduit connects to inlet diffuser 28 for feeding into the quiescent zone.

Outlet pipe 30 that connects to the container at the quiescent zone will be described in more detail later. The outlet pipe 30 and drain pipe 34 connect into open box 32. It will be understood that the liquid is fed into the container 12 at some rate determined by outside factors. The separator is maintained so that the liquid surface level 14 is about constant with the liquid level within the open box 32, all as explained in my prior patent.

It will be understood that the equipment and structure described to this point is as shown in my prior patent.

Plenum ring 36 is a ring which is attached to and encircles the container 12 like a girdle or belt. A band of holes are cut through the container 12 so that the plenum ring 36 is fluidly connected to the container 12. Specifically, there are three rings of holes. The upper holes 38 in the upper ring are all at the same level. I.e., they all lie in a plane normal or at right angles to the axis "a" of the container 12. Middle holes 40 of the middle ring are below the upper holes 38 and are above lower holes 42 of the lower ring. There are about 20 holes in each ring, for a total of 60 holes through the container 12.

The plenum ring 36 and thus, the upper holes 38, are well below the inlet diffuser 28.

The upper ring of holes 38 open into the plenum ring 36 immediately below top plate 44 of the plenum ring. The top or upper holes 38 are flush with the bottom of the top plate 44. Likewise, the lower holes are flush with the top of bottom plate 46 of the plenum ring. The middle holes 40 are about halfway between the upper holes 38 and lower holes 42.

The outlet pipe 30 connects into the plenum ring 36 through the top plate 44, and the outlet pipe extends vertically upward from the top plate to the open box 32. Drain plate 48 is connected into the plenum ring adjacent to the connection of the outlet pipe into the plenum ring. The drain plate will extend across the entire cross sectional area of the plenum ring, thereby blocking the flow through the plenum ring. That means that the flow through the plenum ring will be in one direction only. Also, it will be understood that the flow into the plenum ring will be a gentle flow because of the large cross sectional area. At least it will be far less turbulent than the flow through a 16" diameter pipe.

In construction, typically the container 12 will be about 14' in diameter, and the inlet pipe will be about 12" to 16" in diameter. Also, typically there will be a flow of water through the inlet pipe equal to about 1,000 gallons per minute. The outlet pipe will be about 16" in diameter. The plenum ring is 24" wide and 48" high. Therefore, it may be seen that the plenum ring will have a cross sectional area many times greater than the outlet pipe. The holes 38, 40, and 42 will each be 4" in diameter. Therefore, it may be seen that the total cross sectional area of the 60 holes, although being less than the cross sectional area of the plenum ring will be greater than the cross sectional area of the outlet pipe.

Therefore, it may be seen that the flow through the plurality of holes 38, 40, and 42 will not result in as much turbulence or disturbance in the quiescent zone as the single opening of a 16" pipe into the quiescent zone. Also, the water, once entering the plenum ring, will flow gently. If any tallow or oil enters the plenum ring, due to the gentle flow, it will rise to the top. The flow within the plenum ring is shown by the flow arrows "f".

Figure 3:
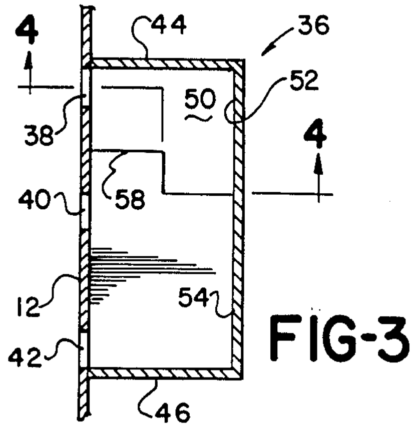
FIG. 3 is a sectional view of a plenum ring taken substantially on line 3—3 of FIG. 2.
Figure 4:
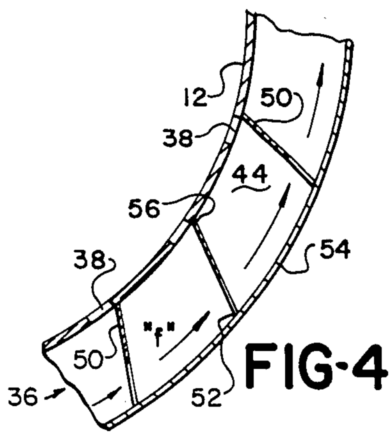
FIG. 4 is a sectional view taken substantially on line 4—4 of FIG. 3.
Figure 5:
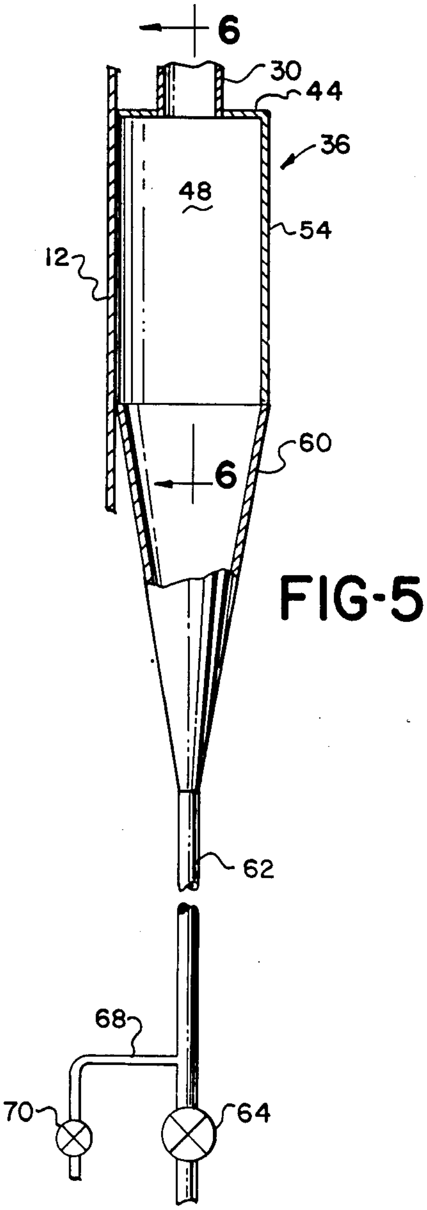
FIG. 5 is a sectional view taken substantially on line 5—5 of FIG. 2.

Baffles 50 are mounted in the plenum ring having the leading edge 52 of each of the baffles attached to the outer plate 54. The trailing edge 56 of each of the baffles 50 is attached to the outer surface of the container 12 immediately behind (in the direction of flow arrows "f") one of the upper holes 38. Therefore, any tallow which may have risen to the top, will be directed by the baffles 50 back into the quiescent zone 24 in the container 12. The baffles 50 extend in the plenum ring, as seen in FIG. 3, so that they extend a distance below the ring and upper holes 38 where the baffles terminate so the bottom edge 58 of the baffles 50 are above the ring of middle holes 40.

Plenum sump 60 is connected into the bottom of the plenum ring through the bottom plate 46 immediately below the connection of the outlet pipe 30 through the top plate 44. Due to the gentle flow into the plenum ring 36, any solids which may enter the plenum ring will settle to the bottom and be carried by the flow (arrows "f") to this tapered funnel like plenum sump 60. Plenum sump line 62 is connected to the bottom of the plenum sump and plenum sump valve 64 is connected in the plenum sump line. The plenum sump line connects into solid drain line 66 which is the same drain line that the sump valve 22 dumps the other solids into. So that there will not be a "dead" fluid space within the plenum sump 60, bleed line 68 is attached into the plenum sump line 62 above the plenum sump valve 64. The bleed line 68 also has a bleed valve 70 therein, and it likewise discharges into the solid drain line 66.

Figure 6:
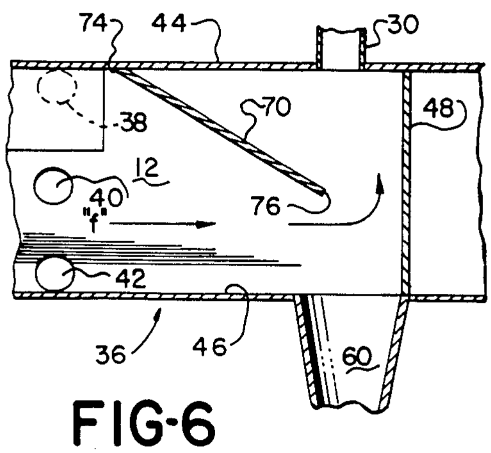
FIG. 6 is a sectional view taken substantially on line 6—6 of FIGS. 2 and 5.

Deflection plate 72 is mounted into the plenum ring 36 immediately forward of the sump 60. As seen in FIG. 6, leading edge 74 of the deflection plate 72 is forward of the plenum sump 60 and attached to the top plate 44. Trailing edge 76 of the deflection plate 72 is about the center of the plenum sump 60. The deflection plate 72, as seen, angles downward at an angle of about 30°. There is ample clearance between the trailing edge 76 and the drain plate 48 to permit the normal flow of clear water to pass upward between the trailing edge 76 and the drain plate 48 into the outlet pipe 30.

Therefore, it may be seen that with the outlet pipe connected through the plenum ring, as according to this invention, that the water in the outlet pipe will have less solids and tallow than in a situation where the outlet line is connected directly into the quiescent zone.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. In a method of separation involving a separator having a. an elongated cylindrical container having
b. vertical axis,
c. liquid in the container with
d. a liquid surface level near the top thereof,
e. scraper means in the container for removing tallow from the liquid surface level,
f. a sump in the bottom of the container with
g. a sump line and
h. a sump valve for draining solids which have settled from the liquid,
i. a quiescent zone of liquid between the scraper means and sump,
j. an inlet conduit for flowing a liquid mixture of at least water, tallow, and solids into the quiescent zone of the separator at
k. an inlet diffuser,
kk. a plenum ring having top, bottom, and outer plates encircling the container at the quiescent zone,
l. an outlet pipe connected into the top plate of the plenum ring having a cross sectional area taking liquid from the quiescent zone;
m. wherein the improvement comprises:
n. withdrawing liquid from the quiescent zone from a plurality of holes in a band around the container, thereby
o. minimally disturbing the quiescent zone, and
p. withdrawing the liquid from a plurality of holes into the plenum which has cross sectional area many times greater than the cross sectional area of the outlet pipe, thereby having a gentle flow of the liquid within the plenum.

2. The invention as defined in claim 1, further comprising:

q. permitting particles of tallow which may flow into the plenum to rise to the top thereof, and
r. directing the gentle flow within the plenum by baffles so that the upper portion of the liquid in the plenum is diverted to flow back into the quiescent zone within the container.

3. The invention as defined in claim 1, further comprising:

q. settling solids to the bottom of the plenum, and
r. withdrawing some of the liquid with the solids from the bottom of the plenum through a plenum sump.

4. The invention as defined in claim 3 further comprising:

s. permitting the tallow to rise to the top of the plenum,
t. withdrawing some of the liquid with the tallow from the top of the plenum and returning it to the container.

5. In a separator having a. an elongated cylindrical container having
b. vertical axis,
c. liquid in the container with
d. a liquid surface level near the top thereof,
e. scraper means in the container for removing tallow from the liquid surface level,
f. a sump in the bottom of the container with
g. a sump line and
h. a sump valve for draining solids which have settled from the liquid,
i. means defining a quiescent zone of liquid between the scraper means and sump,
j. an inlet conduit for flowing a liquid mixture of at least water, tallow, and solids into the quiescent zone of the separator at
k. an inlet diffuser, and
l. an outlet pipe having a cross sectional area taking liquid from the quiescent zone;
m. the improved drain from the quiescent zone to the outlet pipe comprising in combination with the above:
n. means defining a plurality of holes in the container at the quiescent zone,
o. a plenum ring encircling the container at the location of the holes,
p. said outlet pipe connecting into the plenum ring,
q. said plenum ring having top, bottom, and outer plates, and
r. said drain pipe connected into the top plate of the plenum ring.

6. The invention as defined in claim 5 further comprising:

s. said holes at a level on the container below the level of the inlet conduit diffuser.

7. The invention as defined in claim 5 further comprising:

s. a plenum sump in the plenum ring below the drain pipe,
t. a plenum sump line connected to the plenum sump, and
u. a plenum sump valve in the plenum sump line.

8. The invention as defined in claim 7 further comprising:

v. a bleed line located in said plenum sump line between the plenum sump and the plenum sump valve.

9. The invention as defined in claim 7 further comprising:

v. a deflecting plate immediately adjacent to the plenum sump, thereby deflecting the flow, and particularly the solids, downward into said plenum sump.

10. The invention as defined in claim 5 further comprising:

s. a drain plate in the plenum ring adjacent to the connection of the outlet pipe into the plenum ring so that all the liquid from the separator flows in a single direction in the plenum ring.

11. The invention as defined in claim 10 wherein t. said plurality of holes are arranged at three levels, each level being normal to the vertical axis; namely, u. a top level at the top of the plenum ring, v. a middle level at approximately the middle of the plenum ring, and w. a bottom level near the bottom of the plenum ring.

12. The invention as defined in claim 11 further comprising:

x. baffles in the top of the plenum ring for guiding the flow of liquid within the plenum ring toward the top level of holes.

13. The invention as defined in claim 12 further comprising:

v. said baffles extending below the top level of holes and terminating above the middle level of holes.

14. The invention as defined in claim 5 further comprising:

s. the plenum ring having a cross sectional area many times greater than the cross sectional area of the outlet pipe so that the liquid flow in the plenum ring is gentle.

15. The invention as defined in claim 14 further comprising:

t. said holes at a level on the container below the level of the inlet conduit diffuser, and u. a drain plate in the plenum ring adjacent to the connection of the outlet pipe into the plenum ring so that all the liquid from the separator flows in a single direction in the plenum ring.

16. The invention as defined in claim 15 wherein v. said plurality of holes are arranged at three levels, each level being normal to the vertical axis; namely, w. a top level at the top of the plenum ring, x. a middle level at approximately the middle of the plenum ring, and y. a bottom level near the bottom of the plenum ring, and z. baffles in the top of the plenum ring for guiding the flow of liquid within the plenum ring toward the top level of holes, and aa. said baffles extending below the top level of holes and terminating above the middle level of holes.

17. The invention as defined in claim 16 further comprising:

bb. a plenum sump in the plenum ring below the drain pipe, cc. a plenum sump line connected to the plenum sump, and dd. a plenum sump valve in the plenum sump line.

18. The invention as defined in claim 17 further comprising:

ee. a bleed line located in said plenum sump line between the plenum sump and the plenum sump valve, and ff. a deflecting plate immediately adjacent to the plenum sump, thereby deflecting the flow, and particularly the solids, downward into said plenum sump.

* * * * *